May 8, 1951  S. F. CYBULSKI ET AL  2,551,728
APPARATUS FOR PRODUCING A GROOVED ARTICLE
Filed April 26, 1949  2 Sheets-Sheet 1
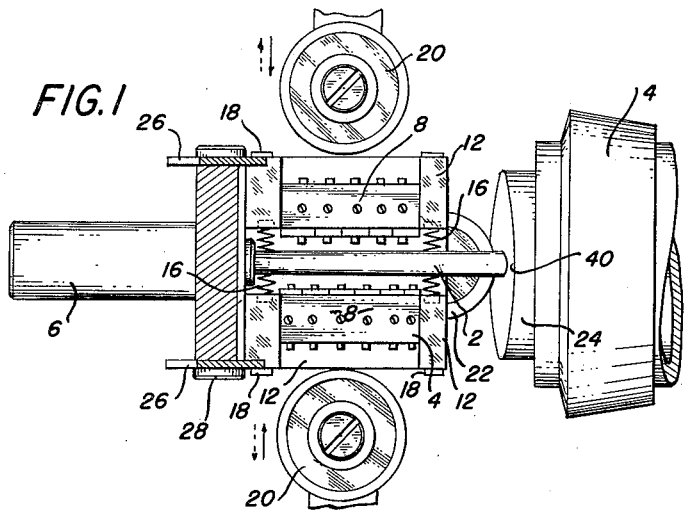
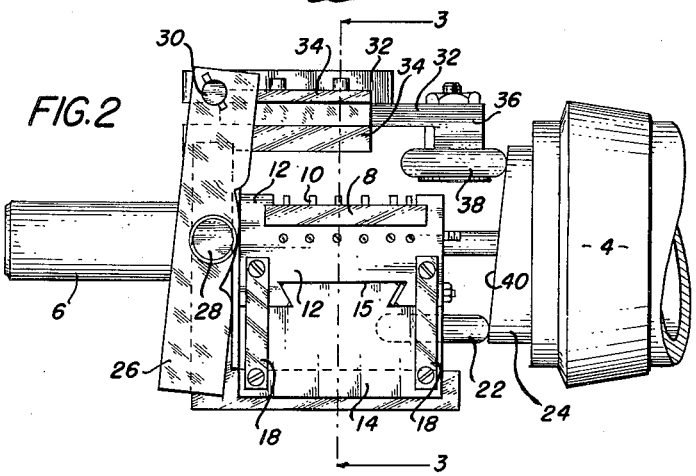
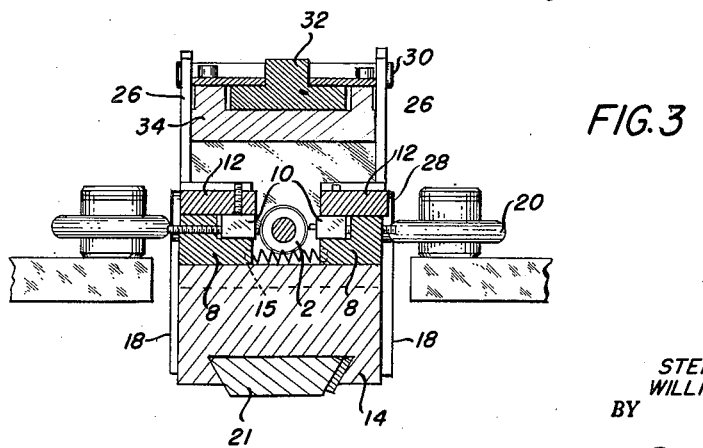
INVENTORS
STEPHEN F. CYBULSKI
WILLIAM C. CHRISTIE
BY
Fisher + Christen,
ATTYS.

May 8, 1951  S. F. CYBULSKI ET AL  2,551,728
APPARATUS FOR PRODUCING A GROOVED ARTICLE
Filed April 26, 1949  2 Sheets-Sheet 2
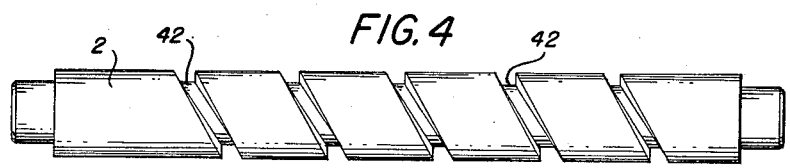
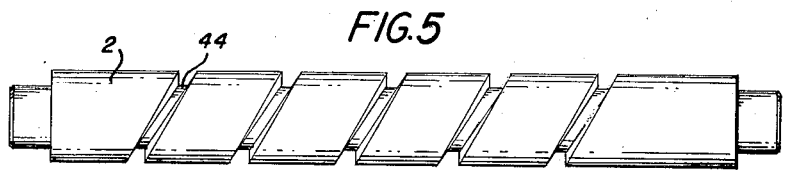
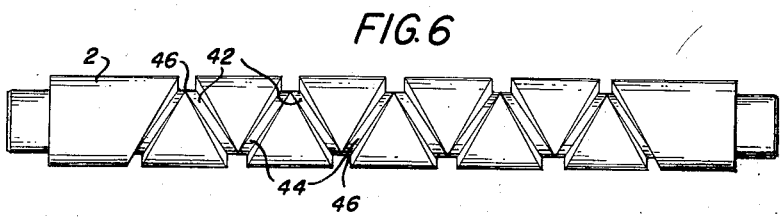
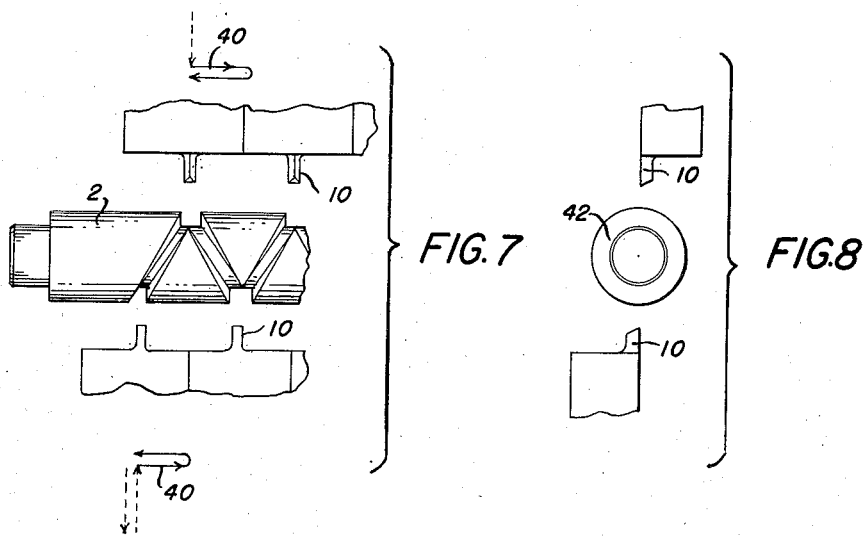
INVENTORS
STEPHEN F. CYBULSKI
WILLIAM C. CHRISTIE
BY
Fisher + Christie,
ATTYS.

Patented May 8, 1951

2,551,728

UNITED STATES PATENT OFFICE 2,551,728

APPARATUS FOR PRODUCING A GROOVED ARTICLE

Stephen F. Cybulski and William C. Christie, Waterbury, Conn.

Application April 26, 1949, Serial No. 89,686

7 Claims. (Cl. 10—101)

This invention is a lathe attachment for simultaneously cutting right and left hand grooves, such for example, as spiral grooves, in a piece of stock, such for example, as a cylinder or rod.

The principal object of the invention is to provide an apparatus wherein cutting tools, positioned on opposite sides of the work, are held to the work and move simultaneously longitudinally of the work, reversing their longitudinal travel for each half revolution of the work.

While the invention is particularly concerned with the simultaneous cutting of right and lefthand spirals and will be so described, it should be understood that it is not necessarily limited to cutting spiral grooves but could be used for cutting other types of grooves, depending upon the relative rate of feed of the tool holders.

According to this invention, a first set of cutters or tools, on one side of the work, moves in one direction longitudinally of the work, while the work makes a half-revolution; the movement of the cutters is then reversed, so that they move in the opposite direction, longitudinally of the work, arriving at the starting position as the work completes the second half of its revolution. These movements of the first set of cutters cut a series of grooves, substantially parallel and all inclined in the same direction.

While the first set of cutters or tools is cutting a series of inclined grooves as just described, the second set of cutters or tools, on the opposite side of the work, is moving at the same rate and in the same direction longitudinally of the work. The cutters on one side are upside down or reversely positioned with respect to the cutters on the opposite side, so as to present cutting edges to the work. This second set of cutters cuts a series of grooves substantially parallel with each other, and all inclined in the same direction with respect to each other, but inclined oppositely with respect to the inclined grooves cut by the first set of cutters.

The foregoing action of all cutters goes on simultaneously. The cutters of the first set are staggered with respect to the cutters of the second set, and the final result of the described action is that the first set of inclined grooves criss-cross with respect to the second set of inclined grooves and form right and left hand spirals, all in one combined operation.

In the preferred embodiment, a plurality of tools, say six, for example, is positioned in a tool holder on one side of the work and a corresponding plurality of tools is positioned in a tool holder on the opposite side of the work, the work being held by and rotated by a chuck in the usual way.

At the beginning of the operation both sets of tools are moved into and held to the work; as the work is rotated by the chuck for 180°, one set of tools makes a series of slots or cuts half-way around the work, say for a right hand spiral; the other set of tools cuts a corresponding plurality of grooves half-way round the work, but for a left hand spiral. When the work has turned 180°, the longitudinal travel of the two tools is reversed, so that the tools which cut the groove for the right-hand spiral now cut grooves for the left-hand spiral and the tools that cut the left-hand spiral now cut grooves for the right-hand spiral. The finished grooves criss-cross and come into registry, so that the result is that the stock at the completion of this operation is provided with both right and left hand spirals.

The two tool holders, positioned on opposite sides of the work and provided with reversed cutters for cutting the grooves, are carried by a tool holder block, mounted to slide longitudinally of the work. This tool holder block is provided with an actuating roller which engages with a cam, which cam has a throw to move the cutters on their first or forward cut, while the work is rotated 180°. To effect the return or reverse movement of the cutters, a pair of rock levers is provided, which engage with the tool holder block; these rock levers are operatively connected to a return slide, which carries a return roller, oppositely positioned with respect to said actuating roller and engageable with the same cam. When the cam has completed its first 180°, the action is reversed, the cam actuates the return roller, which operates the return slide and rock levers and returns the tool holder block to its starting position. This action is repeated as many times as necessary to make cuts of the required depth.

After the right and left grooves have been cut, the means used for pressing the two sets of tools to the work release the tools and spring means are provided for pressing the tools apart to clear them of the work.

Further structural and functional advantages of the invention will be described in connection with the accompanying drawings wherein:

Fig. 1 is a plan view of the lathe attachment of the present invention;

Fig. 2 is a side view of the same;

Fig. 3 is section on the line 3—3 of Fig. 2;

Fig. 4 is a view of the work showing the groove as cut by one set of tools;

Fig. 5 is a view of the work as cut by the opposite set of tools;

Fig. 6 is a view showing the finished work with right and left spiral grooves therein;

Fig. 7 is an exploded diagrammatic view showing the operation of the attachment, and Fig. 8 is an end view of Fig. 7.

Referring now to these drawings, the work 2 which may be a rod or cylinder is held at one end in the chuck indicated generally at 4 and at its other end by the steady pin or holder 6. A pair of tool holders 8 is positioned on opposite sides of the work and each tool holder is provided with a plurality of reversely positioned cutting tools 10. Each tool block 8 is mounted in a tool holder 12. Each tool holder 12 is mounted on a tool holder block 14 with the usual dove-tail connection 15 for lateral slidable movement, toward and away from the work. A plurality of compression springs 16 is mounted between the two tool holders 12 for pressing them away from the work. Leaf springs 18 connected respectively to the base 14 and tool holders 12 are also provided for urging the tool holders 12 away from the work.

The tool holders 12 are forced into and held against the work by a plurality of presser rollers 20 which are actuated to move simultaneously in opposite directions for forcing and holding both tool holders to the work.

While the two holders are thus held to the work, they are simultaneously moved longitudinally of the work. This is accomplished by mounting the tool holder block 14 for longitudinal sliding movement on a guide 21. Block 14 carries an actuating roller 22, adapted to engage against and be operated by cam 24 carried by the chuck 4. At its other end, block 14 engages the lower ends of a pair of rock levers 26, pivoted at 28 to the frame of the attachment. The upper ends of the levers 26 engage a cross rod 30, which rod passes through return slide member 32, slidably mounted in fixed slideway 34. The right hand end of return slide 32 is provided with an extension 36 on which is journaled return roller 38, engageable with and actuated by cam 24. Cam 24 is a circular cam, having inclined face 40, having its high and low points 180° apart, shown in Fig. 2 as engaged with actuating roller 22 and return roller 38.

The presser rollers 20 are intergeared with the drive for the chuck and cam 24 so that such presser rollers move the tools to the work and hold the tools to the work for as long as necessary to cut grooves of the required depth. The presser rollers then release the tool holders and they are pushed away from the work by springs 16 and 18.

As shown in Fig. 7, the cutting tools 10, on one side of the work, are in staggered relation with cutters 10 on the opposite side.

Operation

The operation is as follows: The work being rotated by the chuck 4, the two sets of tools are moved simultaneously from opposite directions into the work by rollers 20. At the same time, the rotating cam 24 pushes roller 22 to move block 14 and both tool holders 8 longitudinally of the work. Rock levers 26 are moved by block 14 to move rod 30, slide 32 and roller 38 to the right, Fig. 2. This continues for one-half revolution. The high part of cam face 40 is now in engagement with roller 38, moving it and return slide 36 to the left, actuating rock levers 26 to return tool holder block 14 to its original position. This cycle is repeated as often as necessary to make cuts of the required depth.

One set of tools, in making its forward and return stroke, traveling a distance indicated by arrows 40 in Fig. 7, cuts a plurality of inclined grooves 42, as shown in Fig. 4, which may be considered parallel to each other. At the same time, the other set of cutters cuts a series of grooves 44, inclined in the opposite direction and these also may be considered parallel to each other. The two sets of grooves criss-cross, as shown in Figs. 6, and provide the work with left and right hand grooves, here shown for example, as spiral grooves in Fig. 6. The two sets of grooves intersect every 180°, as shown at 46, so that a complete spiral is formed by successive registry of 180° segments of grooves 42 and 44.

By the operation described, two sets of oppositely inclined grooves may be simultaneously cut in a piece of stock, thereby achieving rapid and efficient operation.

While the apparatus has been described in some detail, it should be understood that the invention is not to be limited to the exact details shown, and that other apparatus may be used for carrying out the invention.

We claim as our invention:

1. An attachment for a lathe for cutting criss-cross, oppositely sloping grooves in a piece of cylindrical stock comprising a pair of tool holders positioned on opposite sides of the work and each provided with a plurality of cutting tools, means for holding said tool holders to the work with the cutting tools in engagement therewith, means for moving the tool holders and cutters simultaneously back and forth in the same direction in substantially parallel paths longitudinally of the work, and a rotary cam carried by the chuck of the lathe for actuating said last mentioned means.

2. An attachment for a lathe for cutting criss-cross, oppositely sloping grooves in a piece of cylindrical stock, comprising a pair of tool holders positioned on opposite sides of the work and each provided with a plurality of cutting tools, means for holding said tool holders to the work with the cutting tools in engagement therewith, a rock lever operatively connected with said tool holders, and cam-operated means, operable by a rotary cam carried by the chuck of the lathe and cooperating with said rock lever, for moving the tool holders back and forth in the same direction in substantially parallel paths longitudinally of the work.

3. An attachment for a lathe for cutting criss-cross oppositely sloping grooves in a piece of cylindrical stock, comprising a pair of tool holders positioned on opposite sides of the stock and each provided with a plurality of cutting tools, means for holding said tool holders to the work with the cutting tools in engagement therewith, a pair of rock levers, pivoted intermediate their ends, operatively connected with said tool holders, cam operated means, operated by a rotary cam carried by the chuck of the lathe, for moving said tool holders in one direction longitudinally of the work, at the same time rocking said rock levers in one direction, and cam operated means, operated by the same rotary cam, for moving said tool holders in the opposite direction, longitudinally of the work, at the same time rocking said rock levers in the opposite direction.

4. An attachment for a lathe for cutting criss-cross, oppositely sloping grooves in a piece of cylindrical stock, comprising a pair of tool holders positioned on opposite sides of the stock and each provided with a plurality of cutting tools, means for holding said tool holders to the work with the cutting tools in engagement therewith, a tool block for carrying said tool holders, a pair of rock levers engageable with said tool block, at corresponding ends thereof, a slideway engageable with the other ends of said rock levers, cam operated means for moving said tool block in one direction longitudinally of the work, and cam operated means for operating said slideway and rock levers for moving said tool block in the opposite direction, longitudinally of the work.

5. An attachment for a lathe for cutting criss-cross, oppositely sloping grooves in a piece of cylindrical stock, comprising a pair of tool holders positioned on opposite sides of the stock and each provided with a plurality of cutting tools, means for holding said tool holders to the work with the cutting tools in engagement therewith, a tool block for carrying said tool holders, a pair of rock levers engageable with said tool block, at corresponding ends thereof, a slideway engageable with the other ends of said rock levers, cam operated means, operated by a rotary cam carried by the chuck of the lathe, for moving said tool block in one direction as the cam rotates 180°, and cam operated means, operated by the same rotary cam, for operating said slideway and rock levers for moving said tool block in the opposite direction, longitudinally of the work, as the cam rotates for another 180°.

6. A machine tool, comprising a chuck provided with a rotary cam, a pair of tool holders positioned on opposite sides of the stock and each provided with a plurality of cutting tools, means for holding said tool holders to the work with the cutting tools in engagement therewith, a pair of rock levers, pivoted intermediate their ends, operatively connected with said tool holders, cam operated means, operated by said cam, for moving said tool holders in one direction longitudinally of the work, at the same time rocking said rock levers in one direction, and cam operated means, operated by said rotary cam, for moving said tool holders in the opposite direction, longitudinally of the work, at the same time rocking said rock levers in the opposite direction, for thereby cutting criss-cross, oppositely sloping grooves in said stock.

7. A machine tool, comprising a chuck provided with a rotary cam, a pair of tool holders positioned on opposite sides of the stock and each provided with a plurality of cutting tools, means for holding said tool holders to the work with the cutting tools in engagement therewith, a tool block for carrying said tool holders, a pair of rock levers engageable with said tool block, at corresponding ends thereof, a slideway engageable with the other ends of said rock levers, cam operated means, operated by said rotary cam, for moving said tool block in one direction as the cam rotates 180°, and cam operated means, operated by the same rotary cam, for operating said slideway and rock levers for moving said tool block in the opposite direction, longitudinally of the work, as the cam rotates for another 180°, for thereby cutting criss-cross, oppositely sloping grooves in said stock.

STEPHEN F. CYBULSKI.
WILLIAM C. CHRISTIE.

REFERENCES CITED

The following references are of record in the file of this patent:

UNITED STATES PATENTS

| Number | Name | Date |
|---|---|---|
| 303,317 | Ostrom | Aug. 12, 1884 |
| 1,344,536 | Jerram | June 22, 1920 |
| 1,611,191 | Heard et al. | Dec. 21, 1926 |
| 1,766,210 | Batie | June 24, 1930 |
| 1,910,420 | Arenz | May 23, 1933 |
| 2,409,993 | Stupakoff | Oct. 22, 1946 |
| 2,471,654 | Reitz | May 31, 1949 |

FOREIGN PATENTS

| Number | Country | Date |
|---|---|---|
| 393,460 | Great Britain | June 8, 1933 |